United States Patent
Okada (10) Patent No.: US 7,329,858 B2
(45) Date of Patent: Feb. 12, 2008

(54) OPTICAL ENCODER AND ELECTRONIC EQUIPMENT HAVING SAME

(75) Inventor: Norikazu Okada, Kashihara (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 0 days.

(21) Appl. No.: 11/104,589

(22) Filed: Apr. 13, 2005

(65) Prior Publication Data

US 2005/0230608 A1 Oct. 20, 2005

(30) Foreign Application Priority Data

Apr. 14, 2004 (JP) ............... P2004-118909

(51) Int. Cl.
- *G01D 5/34* (2006.01)
- *G01D 5/36* (2006.01)
- *G01B 11/14* (2006.01)
- *G01B 5/24* (2006.01)
- *G01B 7/30* (2006.01)
- *H03M 1/22* (2006.01)

(52) U.S. Cl. ............... 250/231.13; 250/237 G; 250/237 R; 356/614; 356/616; 341/11; 341/13; 33/1 N; 33/1 PT (58) Field of Classification Search ............... 250/205, 250/231.13–231.18, 237 G, 237 R; 33/1 N, 33/1 PT; 341/11, 13, 31; 356/616, 617, 356/614

See application file for complete search history.

(56) References Cited

U.S. PATENT DOCUMENTS

| | | | | |
|---|---|---|---|---|
| 4,327,362 A | * | 4/1982 | Hoss | 340/870.02 |
| 4,704,523 A | | 11/1987 | Uchida | |
| 6,486,802 B2 | * | 11/2002 | Watanabe | 341/13 |

FOREIGN PATENT DOCUMENTS

| | | | |
|---|---|---|---|
| JP | 60-218028 | | 10/1985 |
| JP | 60-222719 A | | 11/1985 |
| JP | 3-191826 | | 8/1991 |
| JP | 6-147918 A | | 5/1994 |
| JP | 2000-193492 A | | 7/2000 |
| JP | 2001-311630 A | | 11/2001 |
| JP | 2003-4488 A | | 1/2003 |
| JP | 2003-65802 A | | 3/2003 |
| JP | 2003-065802 | * | 5/2003 |

* cited by examiner

*Primary Examiner*—Georgia Epps
*Assistant Examiner*—Don Williams
(74) *Attorney, Agent, or Firm*—Birch, Stewart, Kolasch & Birch, LLP (57) ABSTRACT

An optical encoder includes a mobile object having a plurality of aligned slits, a light-emitting portion for emitting light toward the mobile object, and a light-receiving portion 103 for receiving the light which has passed the mobile object. The light-receiving portion 103 produces an AC (Alternating Current) signal in an oscillation circuit 111 and outputs an input current, which is changed to an AC, from a light-emitting current output circuit 112 into the light-emitting portion.

14 Claims, 12 Drawing Sheets

OPTICAL ENCODER AND ELECTRONIC EQUIPMENT HAVING SAME

CROSS-REFERENCE TO RELATED APPLICATIONS

This nonprovisional application claims priority under 35 U.S.C. 119 (a) of Japanese application No. 2004-118909 filed on Apr. 14, 2004, the contents of which are fully incorporated herein by reference.

BACKGROUND OF THE INVENTION

The present invention relates to an optical encoder and electronic equipment having the same. More particularly, the present invention relates to an optical encoder using light-receiving devices to detect locations, moving velocities and moving directions of mobile objects.

As a first conventional optical encoder, there is one, as disclosed in JP H2000-193492 A, which includes a light-emitting device for emitting light toward a mobile object and a light-receiving device for receiving light passing through the mobile object, wherein current to the light-emitting device is rectified based on signals outputted from the light-receiving device to automatically correct the amount of emitted light in the light-emitting device.

As a second conventional optical encoder, there is one, as disclosed in JP 2003-65802 A, which includes a plurality of light-emitting devices, a mobile object having a slit portion through which light emitted from the light-emitting devices passes, and a plurality of light-receiving devices for receiving the light, wherein a plurality of light-emitting devices are driven to emit light in time-sharing sequential cycles and information on movement of the mobile object (hereinbelow referred to as "movement information on the mobile object") is detected based only on the light-receiving signal from the light-receiving device corresponding to the light-emitting device which is currently emitting light.

In the first and second conventional optical encoders, power consumption mainly occurs in the light-emitting devices. In the first conventional optical encoder, during velocity detection of the mobile object, the light-emitting device is always in the ON state. In the second conventional optical encoder, one of a plurality of the light-emitting devices is always in the ON state. Therefore, both the first and second conventional optical encoders have such problem as large power consumption.

Further, in the first and second optical encoders, particularly in the case where LEDs (Light Emitting Diodes) with wide directivity are used as the light-emitting devices or in the case where the optical encoders are downsized, incidence of parallel light into the light-receiving devices becomes difficult, thereby making variation in light reception larger and making it difficult to obtain accurate movement information on the mobile object. Also in the second encoder, incidence of parallel light into the light-receiving device is difficult because the property of the respective LEDS remains unchanged, and also there are other factors such as refraction of light in the slit of the mobile object.

SUMMARY OF THE INVENTION

An object of the present invention is to provide an optical encoder capable of reducing power consumption and electronic equipment having the same.

In order to achieve the above object, there is provided an optical encoder, comprising:

a light-emitting portion;

a mobile object having a plurality of aligned light transmission portions through which light emitted from the light-emitting portion is transmitted; and a light-receiving portion for receiving the light coming via the mobile object, wherein information on movement of the mobile object is detected based on change in an amount of received light in the light receiving portion, and the light-receiving portion has a light-receiving device and a driving circuit for supplying an input current, which has been changed to an alternating current, into the light emitting portion.

According to the optical encoder of this structure, supplying an input current, which has been changed to an alternating current by the driving circuit, to the light-emitting portion makes it possible to prevent the light-emitting portion from staying always in the ON state, thereby allowing reduction in power consumption.

In one embodiment of the present invention, the light transmission portion is a slit.

In one embodiment of the present invention, a cycle of the alternating current change is faster than a velocity of the mobile object.

According to the optical encoder in the embodiment, the alternating current change cycle is faster than the velocity of the mobile object, which makes it possible to avoid confusion of changes in the amount of received light in the light-receiving device due to the alternating current change with changes in the amount of received light in the light-receiving device due to movement of the mobile object. Therefore, an S/N ratio (Signal-to-Noise ratio) may be enhanced, allowing accurate movement information on the mobile object to be obtained.

In one embodiment of the present invention, the driving circuit changes emission intensity of the light-emitting portion in conformity with a moving velocity of the mobile object.

According to the optical encoder in the embodiment, changes in the mount of received light in the light-receiving device due to movement of the mobile object is read and the emission intensity of the light-emitting portion is changed in conformity with the moving velocity of the mobile object. Therefore, an S/N ratio (Signal-to-Noise ratio) may be enhanced, allowing accurate movement information on the mobile object to be obtained.

In one embodiment of the present invention, a change cycle of the emission intensity is almost identical to a movement cycle of the slit.

In the optical encoder in the embodiment, a plurality of the light-receiving device are present, each width of the light-receiving devices is almost identical to the width of a portion present in between the light transmission portion and a light transmission portion adjacent to the light transmission portion, and the light-receiving devices are placed at intervals of ¾ and ⁵⁄₄ alternately repeated assuming that the sum of the width of the light transmission portion and the width of the portion is 1.

In one embodiment of the present invention, a plurality of the light-receiving device are present, each width of the light-receiving devices is almost identical to a width of a portion present in between the light transmission portion and a light transmission portion adjacent to the light transmission portion, and the light-receiving devices are placed at intervals of ¾ and ⁵⁄₄ alternately repeated assuming that a sum of a width of the light transmission portion and a width of the portion is 1.

In one embodiment of the present invention, the light has a plurality of different wavelengths, and the light transmission portion comprises a first filter and a second filter different in light transmission wavelength or light reflection wavelength from the first filter.

In one embodiment of the present invention, a plurality of the light-receiving device are present, and a light-receiving wavelength of one of the light-receiving devices is different from the light-receiving wavelength of the other light-receiving devices.

In one embodiment of the present invention, the mobile object has a non-light transmission region where the light is not transmitted or a non-light reflection region where the light is not reflected.

In one embodiment of the present invention, a width of the first filter and a width of the second filter are almost identical, a width of the non-light transmission region or the non-light reflection region is ½ the width of the first and second filters, and the non-light transmission region or the non-light reflection region is placed in between the first filter and the second filter.

In one embodiment of the present invention, a plurality of the light-receiving device are present, each width of the light-receiving devices is almost identical to a width of the first and second filters, and the light-receiving devices are placed such that with a placement cycle of the first filter being 1, an interval of ⅓ and an interval of ⅔ are alternately repeated.

In one embodiment of the present invention, a plurality of the light-receiving device are present, each width of the light-receiving devices is almost identical to a width of the first and second filters, and the light-receiving devices are placed at ⅓ intervals assuming that a placement cycle of the first filter is 1.

An electronic equipment of the second aspect of the invention comprises the optical encoder of the first aspect of the invention.

According to the above-structured electronic equipment, the optical encoder of the first aspect of the invention is included so that accurate movement information on the mobile object may be obtained even in the case where LEDs are used as light-emitting means or in the case where the electronic equipment is downsized.

The optical encoder in the first aspect of the invention can avoid the light-emitting portion to be always in the ON state by supplying an input current, which has been changed to an alternating current by the driving circuit, thereby allowing power consumption to be reduced.

The electronic equipment in the second aspect of the invention has the optical encoder in the first aspect of the invention, so that the accurate movement information on the mobile object may be obtained even in the case where LEDs are used as light-emitting portion or in the case where the electronic equipment is downsized.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The optical encoder of the present invention is hereinbelow described in detail in conjunction with the embodiments with reference to the accompanying drawings.

Figure 1:
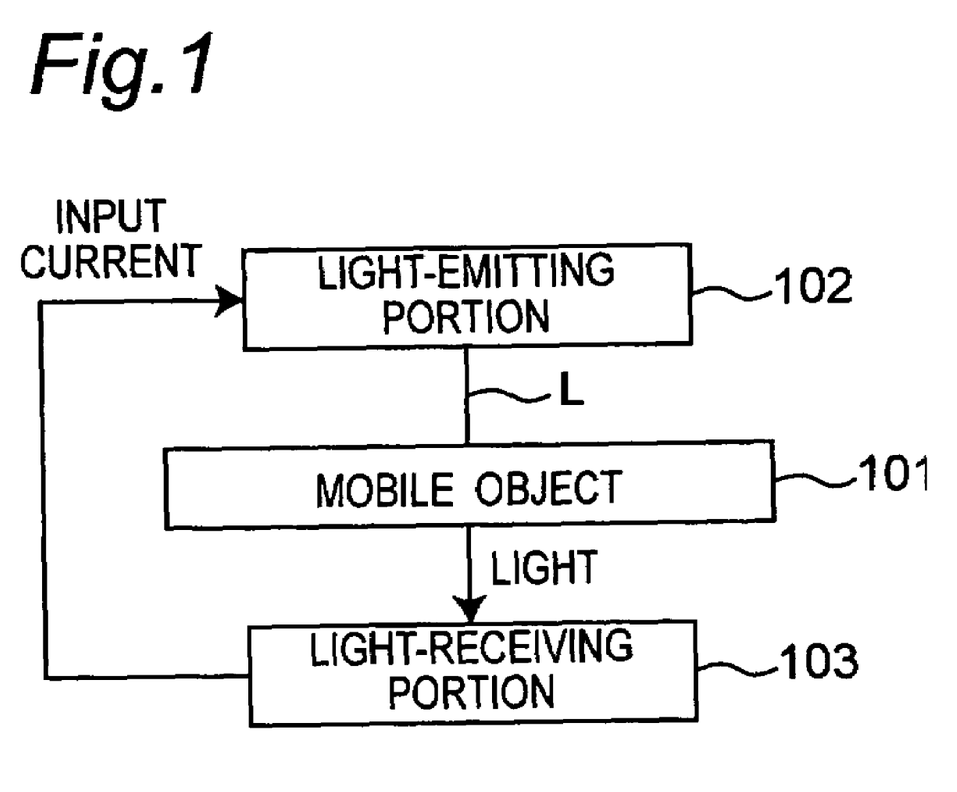
FIG. 1 is a block diagram showing an optical encoder in one embodiment of the present invention.

FIG. 1 is a block diagram showing an optical encoder in one embodiment of the present invention.

The optical encoder is composed of a mobile object 101 on which a plurality of slits 101a (101a) are aligned, a light-emitting potion 102 for emitting light L toward the mobile object 101, and a light-receiving portion 103 for receiving the light L which has passed the mobile object 101.

Figure 2:
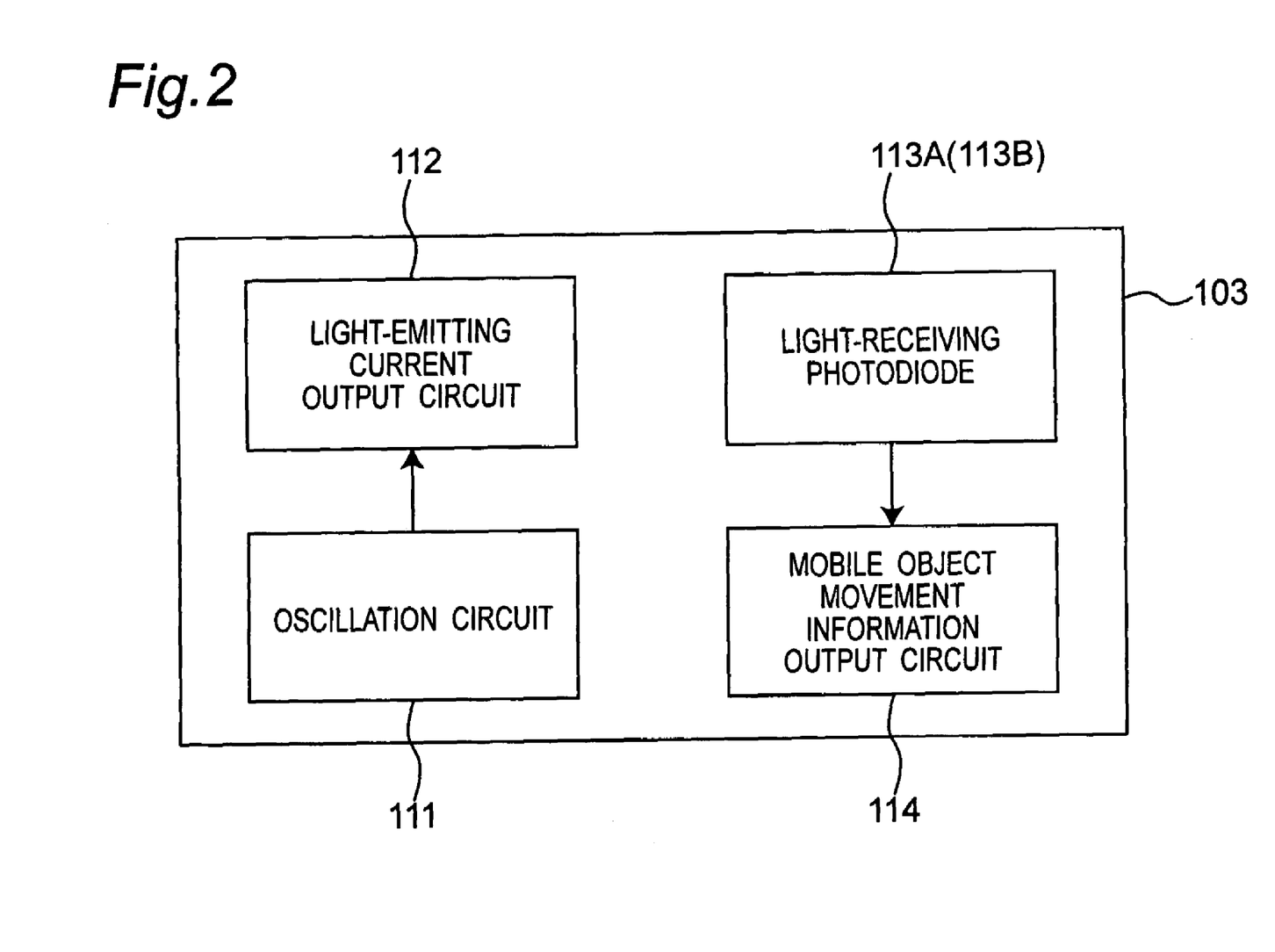
FIG. 2 is a block diagram for explaining the configuration of a light-receiving portion in the optical encoder.

FIG. 2 is a block diagram for explaining the configuration of the light-receiving portion 103.

The light-receiving portion 103 produces an AC (Alternating Current) signal in an oscillation circuit 111 as an example of the driving circuit and outputs an input current which is changed to an AC from a light-emitting current output circuit 112 into the light-emitting potion 102. The oscillating frequency of the oscillation circuit 111 is set higher than the moving velocity of the mobile object 101 in order to avoid confusion of change in the amount of received light in the light-receiving device due to AC change with change in the amount of received light in the light-receiving device due to movement of the mobile object at the time of reading movement information on the mobile object 101. For example, assuming that the moving velocity of the mobile object 101 is 10 kHz, the oscillating frequency of the oscillation circuit 111 is set at 1 MHz.

Moreover, the light-receiving portion 103 receives light L, which has passed the mobile object 101, in light-receiving photodiodes 113A, 113B, and a mobile object movement information output circuit 114 outputs movement information (e.g., moving velocity) on the mobile object 101 based on the outputs from the light-receiving photodiodes 113A, 113B. By incorporating the mobile object movement information output circuit 114 in, for example, a filter circuit, detection errors of the movement information on the mobile object 101 may be suppressed. More particularly, accurate detection of the movement information on the mobile object 101 may be achieved.

According to the optical encoder with this structure, an input current which is changed to an AC is inputted into the light-emitting potion 102 by the light-emitting current output circuit 112, which allows power consumption to be reduced compared to the case where a DC current is always supplied to the light-emitting potion 102.

Although it is possible to input an input current which is changed to an AC from circuits other than the light-receiving portion 103 into the light-emitting portion 101, it is beneficial to input an input current which is changed to an AC from a circuit in the light-receiving portion 103 into the light-emitting portion 101 for reducing the number of component parts to be used or for suppressing dispersion in characteristics.

Hereinbelow, the use of the optical encoder is described with reference to FIG. 3 to FIG. 6.

Figure 3:
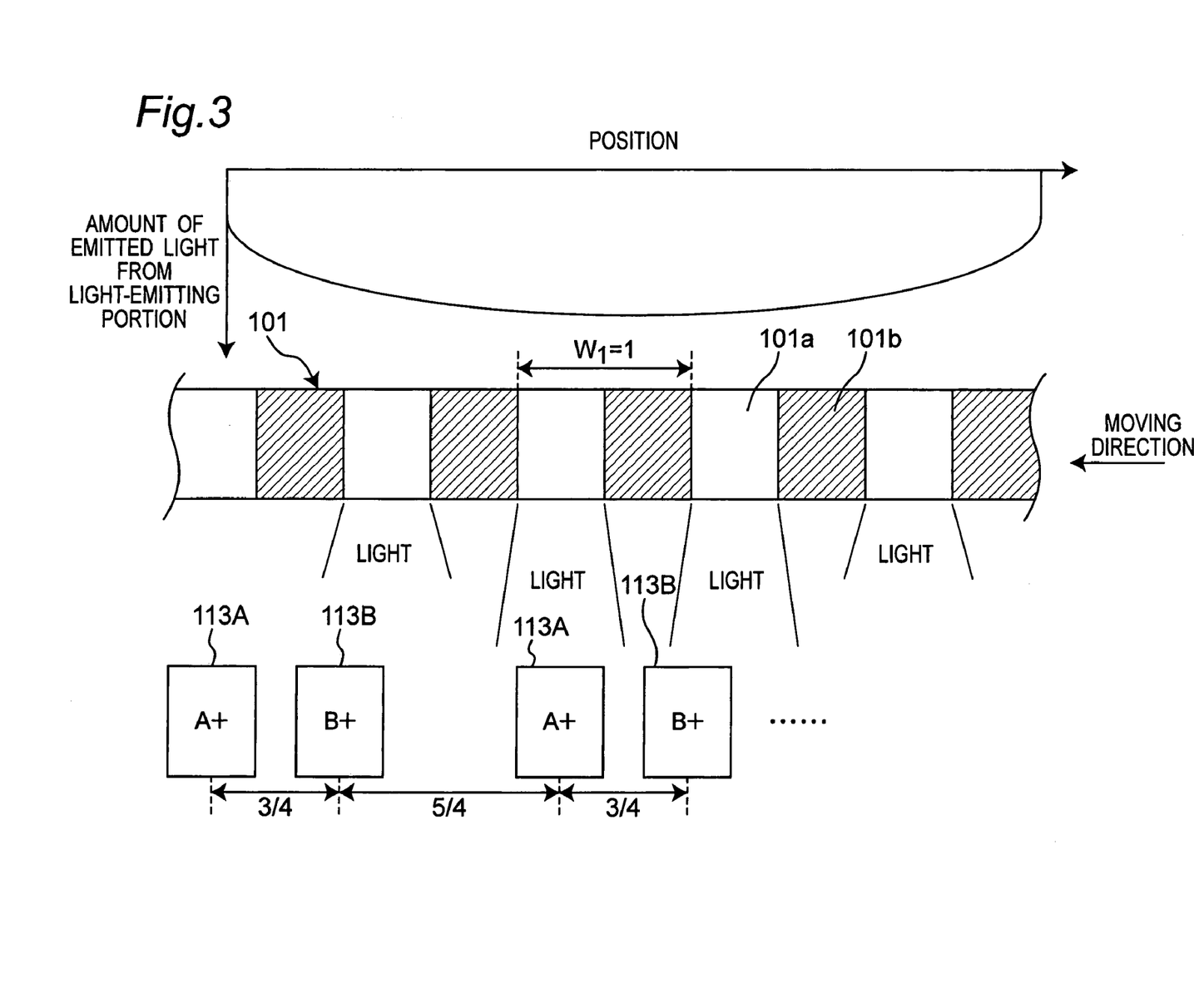
FIG. 3 is a schematic view for explaining a use of the optical encoder.

In the case of using an LED as an example of the light-emitting potion 102, the directivity of light emitted from the LED is wide as shown in FIG. 3, so that after passing through the slits 101a of the mobile object 101, the light leaks into regions below non-light transmission portions 101b of the mobile object 101, thereby deteriorating the S/N ratio.

Figure 4:
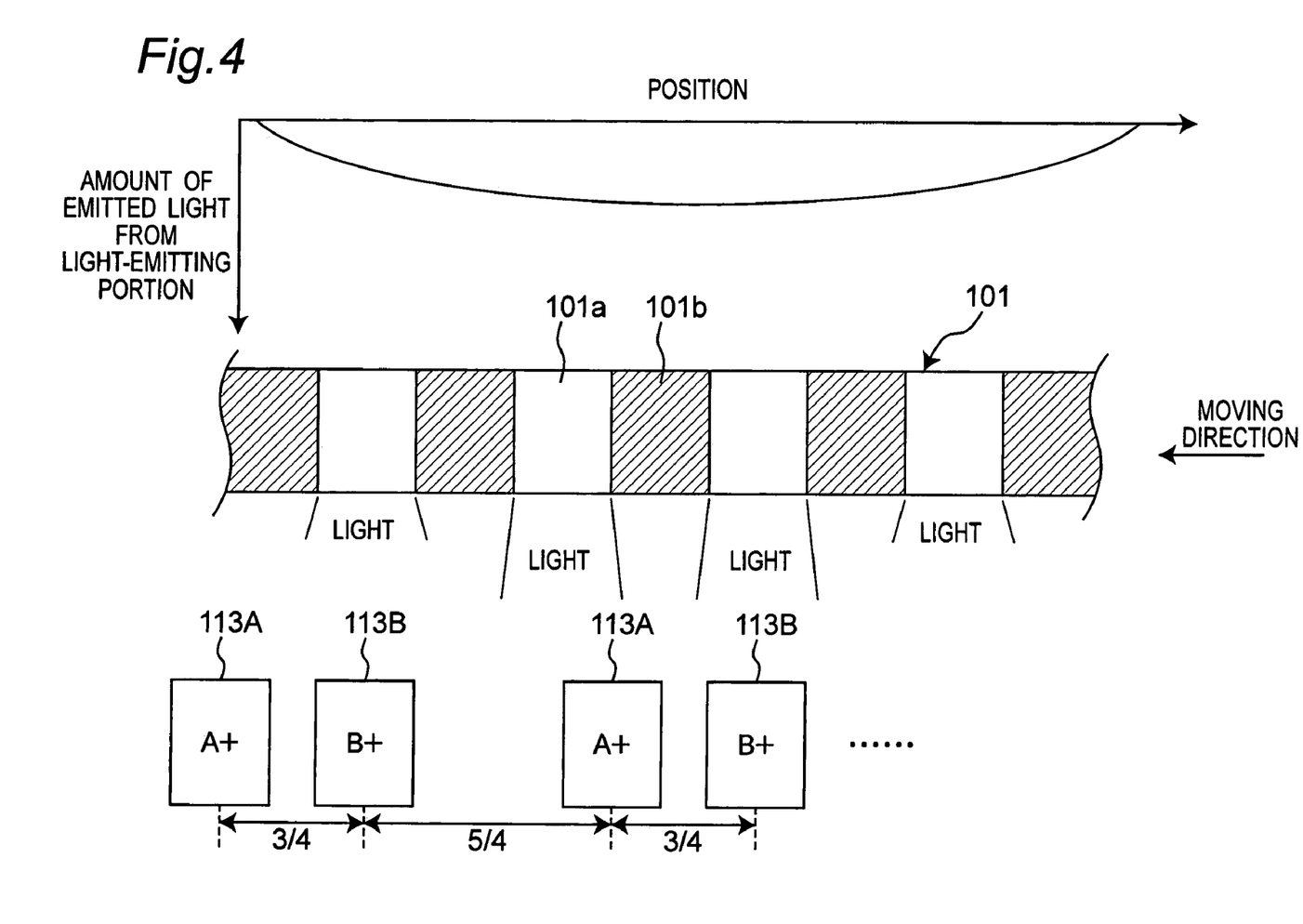
FIG. 4 is a schematic view for explaining a use of the optical encoder.
Figure 5:
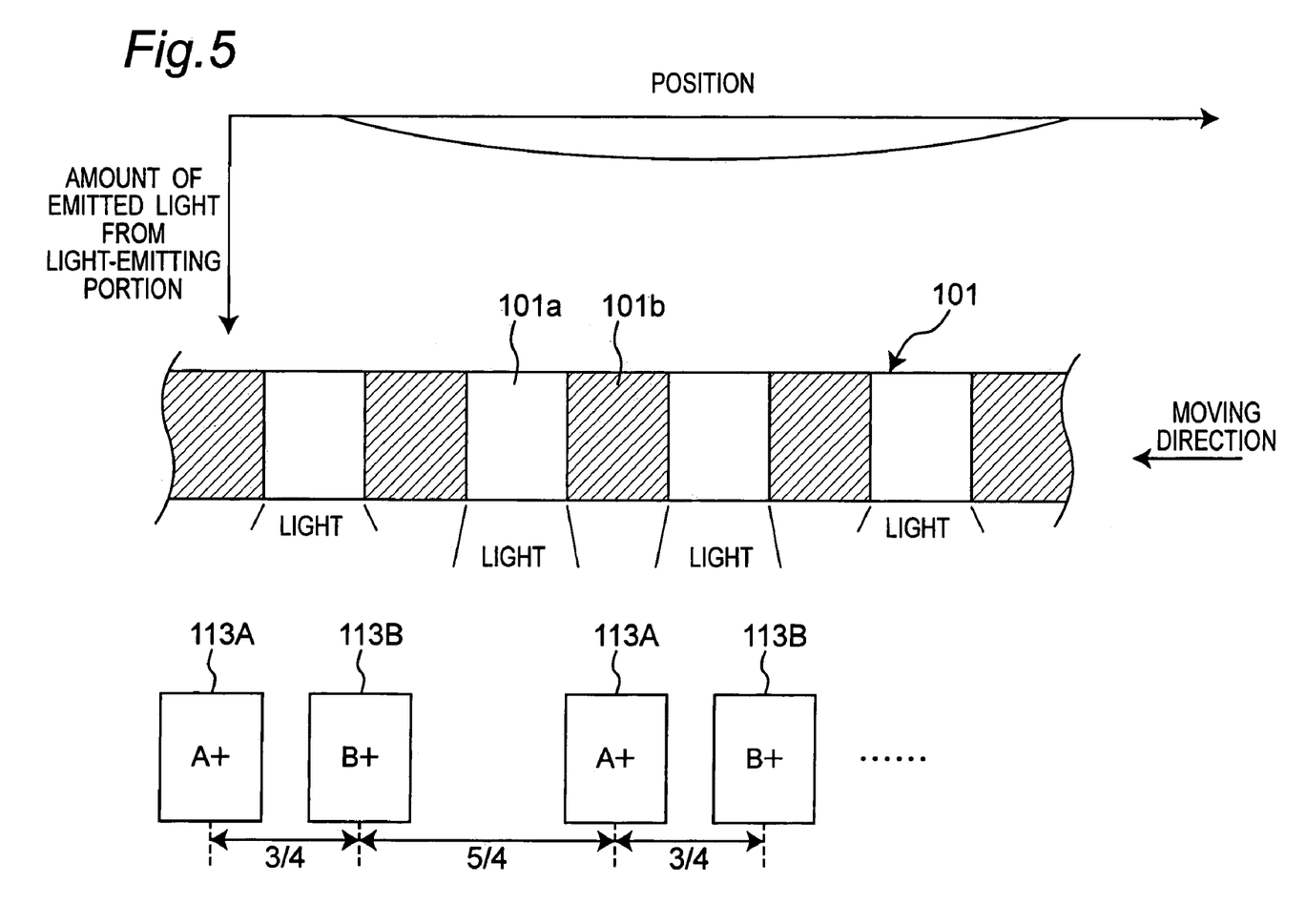
FIG. 5 is a is a schematic view for explaining a use of the optical encoder.

However, an input current into the LED is changed to an AC so that the amount of emitted light from the LED is changed from the state in FIG. 3 to the state in FIGS. 4 and 5, i.e., the amount of emitted light from the LED increases when the light-receiving photodiode 113A of A+faces the slit 101a and the amount of emitted light from the LED decreases when the light-receiving photodiodes 113A of A+faces the non-light transmission portion 101b in response to the movement of the mobile object 101, by which change in the amount of received light in the light-receiving photodiode 113A increases, thereby allowing the S/N ratio to be improved.

Moreover, the width of the light-receiving photodiodes 113A, 113B and the width of the non-light transmission portion 101b are set almost identical, and a plurality of the light-receiving photodiodes 113A, 113B are placed at intervals of ¾ and ⁵⁄₄ alternately repeated. More particularly, a plurality of the light-receiving photodiodes 113A, 113B are placed at intervals of $W_1 \times 3/4$ and $W_1 \times 5/4$ alternately repeated assuming that a sum of a width of the light transmission portion 101a and the width of the non-light transmission portion 101b is W. Consequently, by reading the change of emitted light amount from the LED in the light-receiving photodiode 113A of A+ and by changing the input current into the LED to an AC, it becomes possible to change the emitted light amount from the LED in the cycle almost identical to that of the mobile object 101.

Figure 6:
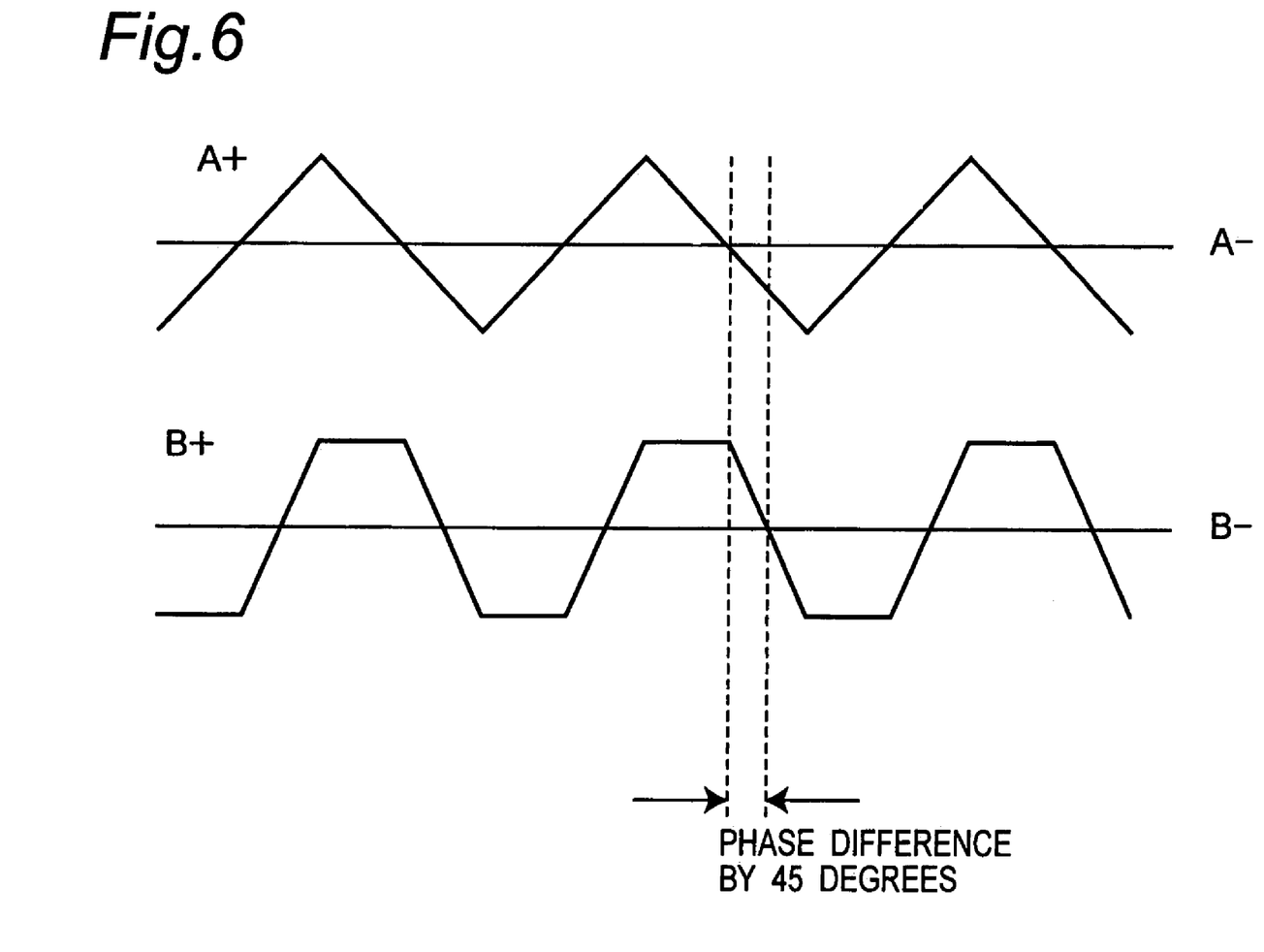
FIG. 6 is a schematic view showing waveforms of currents flowing in light-receiving photodiodes in the light receiving portion.

FIG. 6 shows the actual waveforms of currents flowing in the light-receiving photodiodes 113A, 113B.

Signals from the light-receiving photodiodes 113A, 113B of A+ and B+ are collated with constant DC (direct current) components of A− and B− and are amplified, by which signals with phase difference by 45 degrees can be obtained as outputs.

Figure 7:
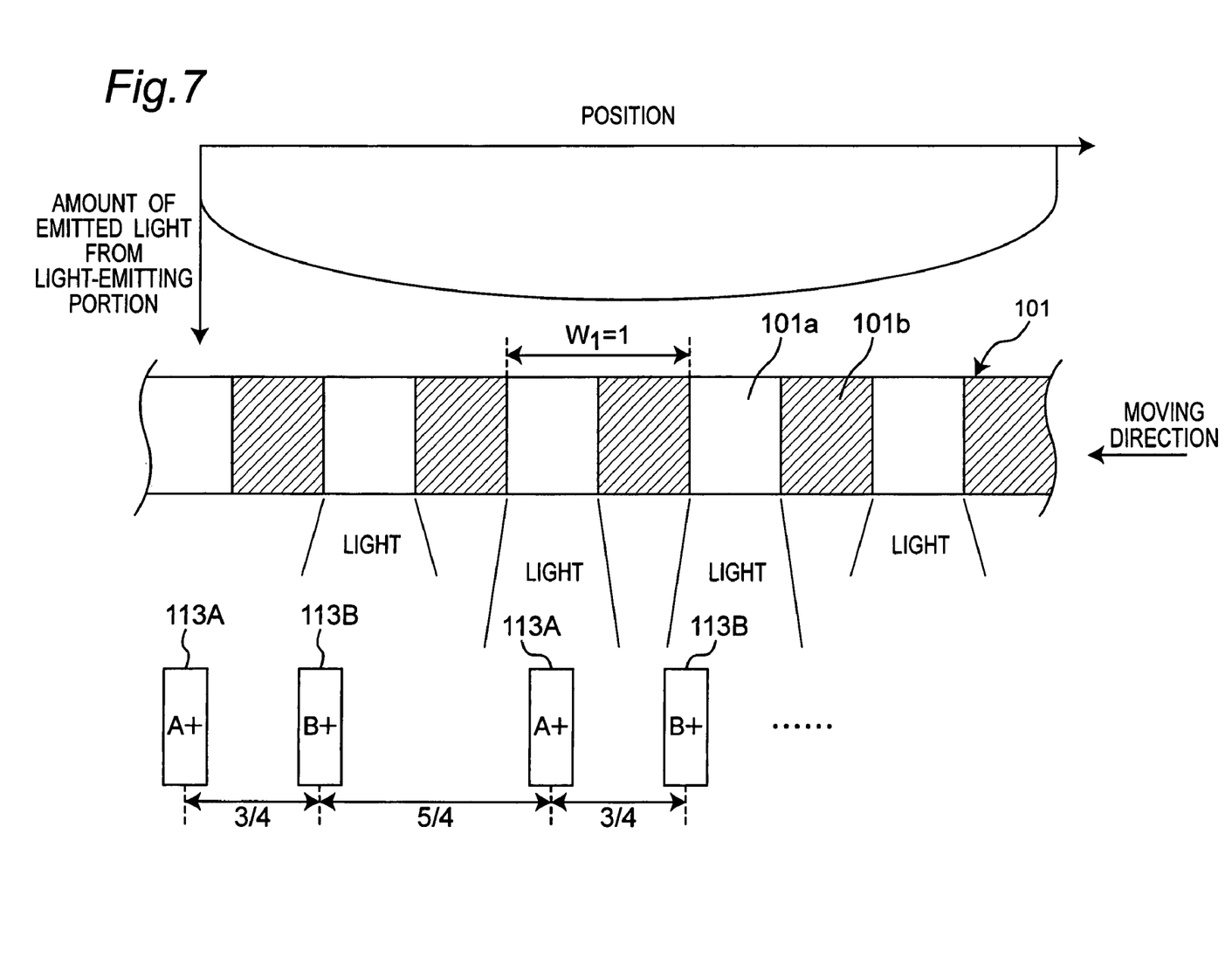
FIG. 7 is a schematic view showing a modified example of the optical encoder.

Moreover, as shown in FIG. 7, the width of the light-receiving photodiodes 113A, 113B is set narrower than the width of the non-light transmission portion 101b, and a plurality of the light-receiving photodiodes 113A, 113B are placed at intervals of $W_1 \times 3/4$ and $W_1 \times 5/4$ alternately repeated, so that the correlation with the light in the diffracted state may be optimized. Therefore, the resolution is further increased and the S/N ratio may further be improved.

Figure 8:
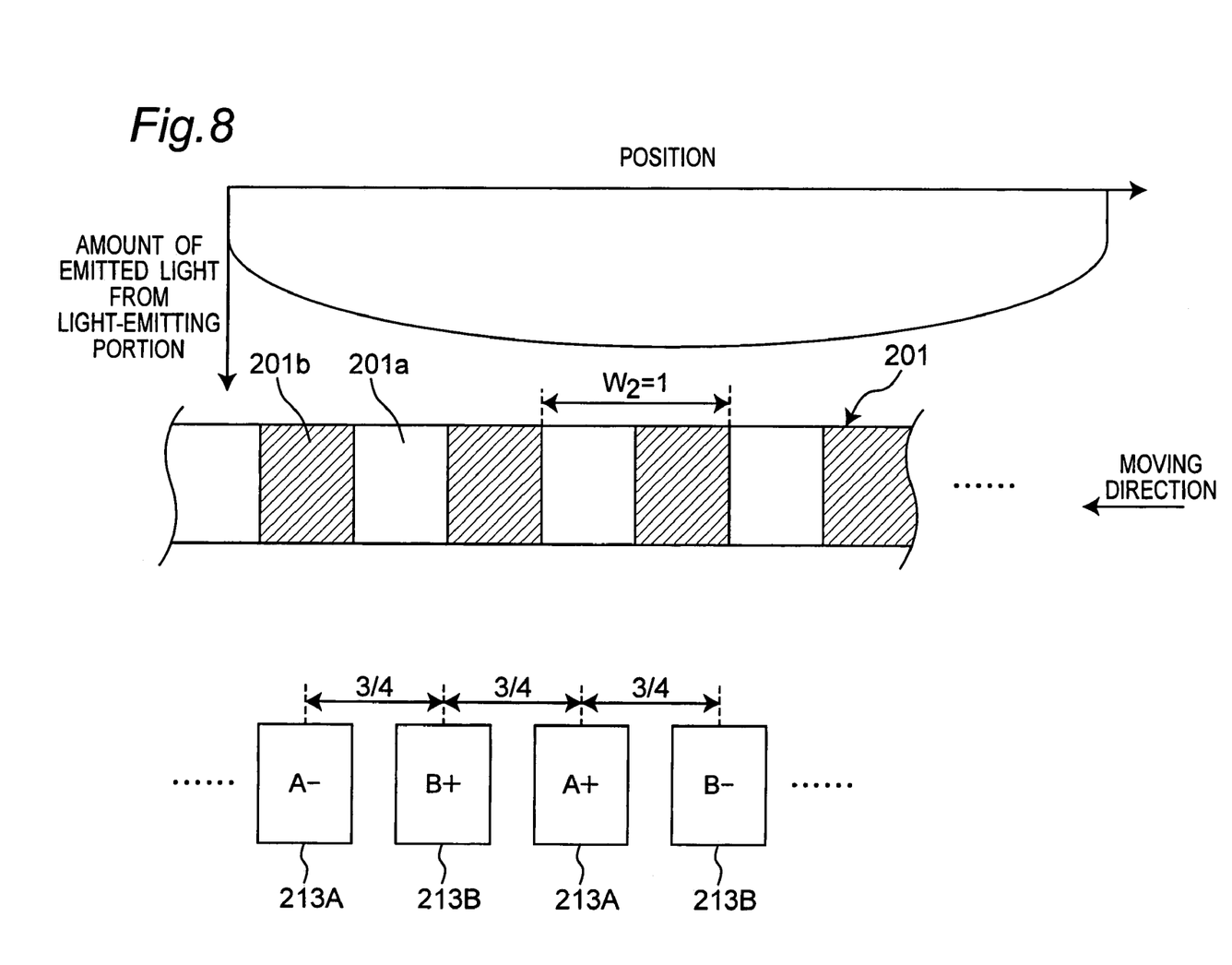
FIG. 8 is a schematic view for explaining a modified example of the optical encoder.

Although the mobile object 101 having the slits 101a has been used in this embodiment, a mobile object 201 shown in FIG. 8 may also be used. The mobile object 201 has a long-wavelength light transmission filter 201a as an example of the first filter and a short-wavelength light transmission filter 201b as an example of the second filter. In the case of using such a mobile object 201, it is preferable that light from the light-emitting portion 101 is received by light-receiving photodiodes 213A of A− and A+which receive long-wavelength light and light-receiving photodiodes 213b of B− and B+ which receive short-wavelength light.

Even if light emitted from the light-emitting portion 101 is diffracted, using the mobile object 201 of this structure leads to interference between the long-wavelength light and the short-wavelength light, and therefore by limiting the light-receiving wavelength of the light-receiving photodiodes 213A, 213B, adverse effects of diffracted light may be eliminated, thereby allowing the S/N ratio to be improved.

Moreover, in the case of the mobile object 201, assuming that a width $W_2$ is 1, a plurality of the light-receiving photodiodes 213A of A−, the light-receiving photodiodes 213b of B+, the light-receiving photodiodes 213A of A+ and the light-receiving photodiodes 213b of B− are placed repeatedly in this order at ⅘ intervals, so that larger and accurate movement information on the mobile object may be taken in. More particularly, a plurality of the light-receiving photodiodes 213A of A−, the light-receiving photodiodes 213B of B+, the light-receiving photodiodes 213A of A+ and the light-receiving photodiodes 213B of B− are placed repeatedly in this order at $W_2 \times 4/5$ intervals, so that larger and more accurate movement information on the mobile object may be obtained. It is to be noted that the width $W_2$ is the sum of the width of the long-wavelength light transmission filter 201a and the width of the short-wavelength light transmission filter 201b.

Moreover, in the case of using the configuration shown in FIG. 8, a phase difference between chA and chB may be used as an output signal.

Figure 9:
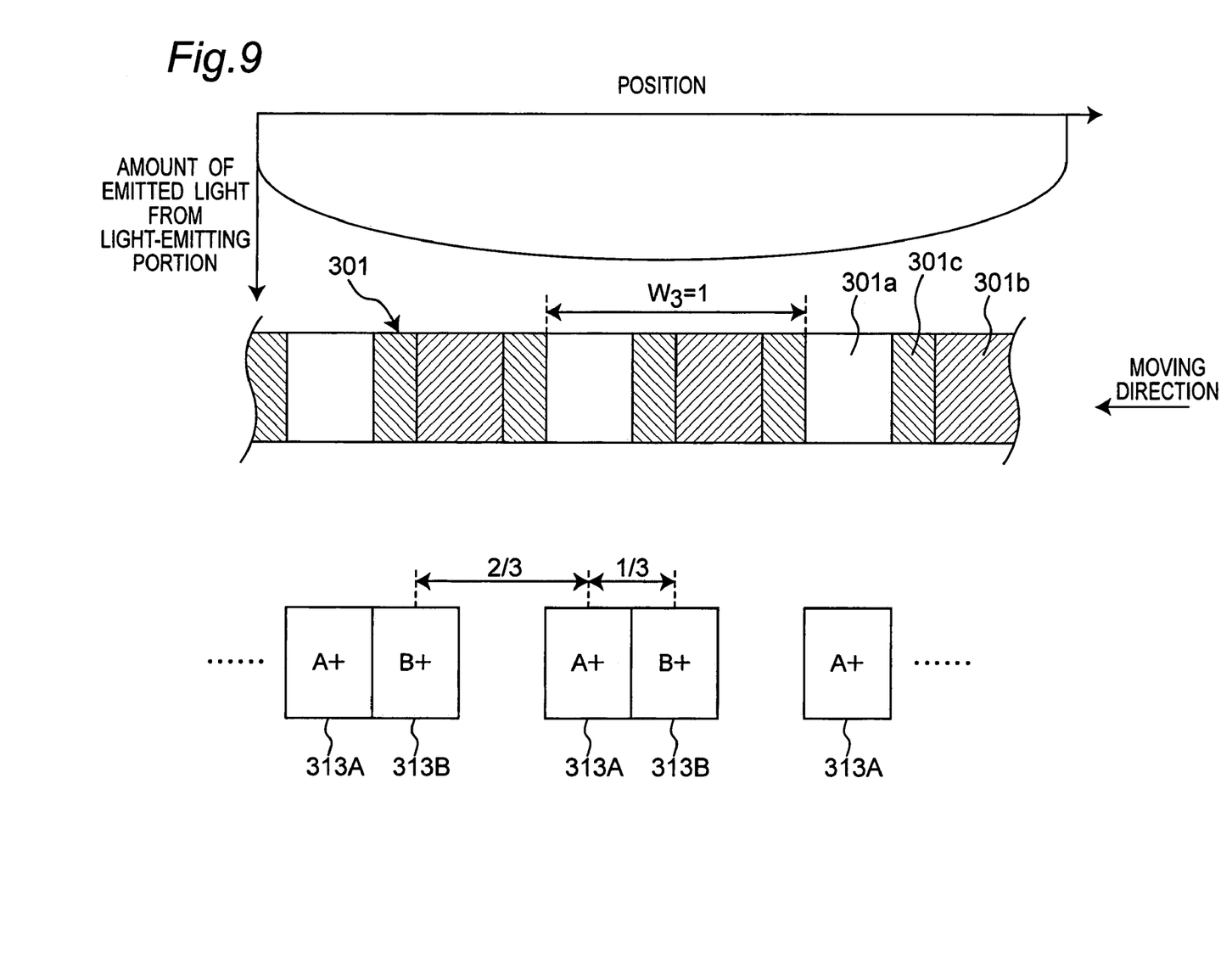
FIG. 9 is a schematic view for explaining a modified example of the optical encoder.

Moreover, a mobile object 301, as shown in FIG. 9, may also be used. The mobile object 301 has a long-wavelength light transmission filter 301a, a short-wavelength light transmission filter 301b and a non-light transmission region 301c. In the mobile object 301, the long-wavelength light transmission filter 301a, the non-light transmission region 301c, the short-wavelength light transmission filter 301b and the non-light transmission region 301c are aligned repeatedly in this order. In the case of using such a mobile object 301, it is preferable that light from the light-emitting portion 101 is received by light-receiving photodiodes 313A of A+ which receive long-wavelength light and light-receiving photodiodes 313B of B+ which receive short-wavelength light.

Using the mobile object 301 of this configuration is beneficial because it combines the use of the filter and the non-light transmission region and allows further reduction of light diffraction.

Moreover, in the case of using the mobile object 301, the width of the long-wavelength light transmission filter 301a and the width of the short-wavelength light transmission filter 301b are set almost identical and the width of the non-light transmission region 301c is set to be almost ½ the width of the long-wavelength light transmission filter 301a or the short-wavelength light transmission filter 301b, so that light interference between long-wavelength light and short-wavelength light may be decreased.

Moreover, in the case of using the mobile object 301, all the widths of the long-wavelength light transmission filter 301a, the short-wavelength light transmission filter 301b and the light-receiving photodiodes 313A, 313B are set to be almost identical, and a plurality of the light-receiving photodiodes 313A, 313B are placed at intervals of ⅔ and ⅓ alternately repeated assuming that a width $W_3$ being 1. More particularly, all the widths of the long-wavelength light transmission filter 301a, the short-wavelength light transmission filter 301b and the light-receiving photodiodes 313A, 313B are set to be almost identical, and a plurality of the light-receiving photodiodes 313A, 313B are placed at intervals of $W_3 \times 2/3$ and $W_3 \times 1/3$ alternately repeated. This allows photocurrent signals of the light-receiving photodiodes 313A and photocurrent signals of the light-receiving photodiodes 313B to have phases different from each other. It is to be noted that the with $W_3$ is the sum of the widths of the long-wavelength light transmission filter 301a, the non-light transmission region 301c, the short-wavelength light transmission filter 301b and the non-light transmission region 301c. More particularly, the width $W_3$ is a placement cycle of the long-wavelength light transmission filter 301a.

Figure 10:
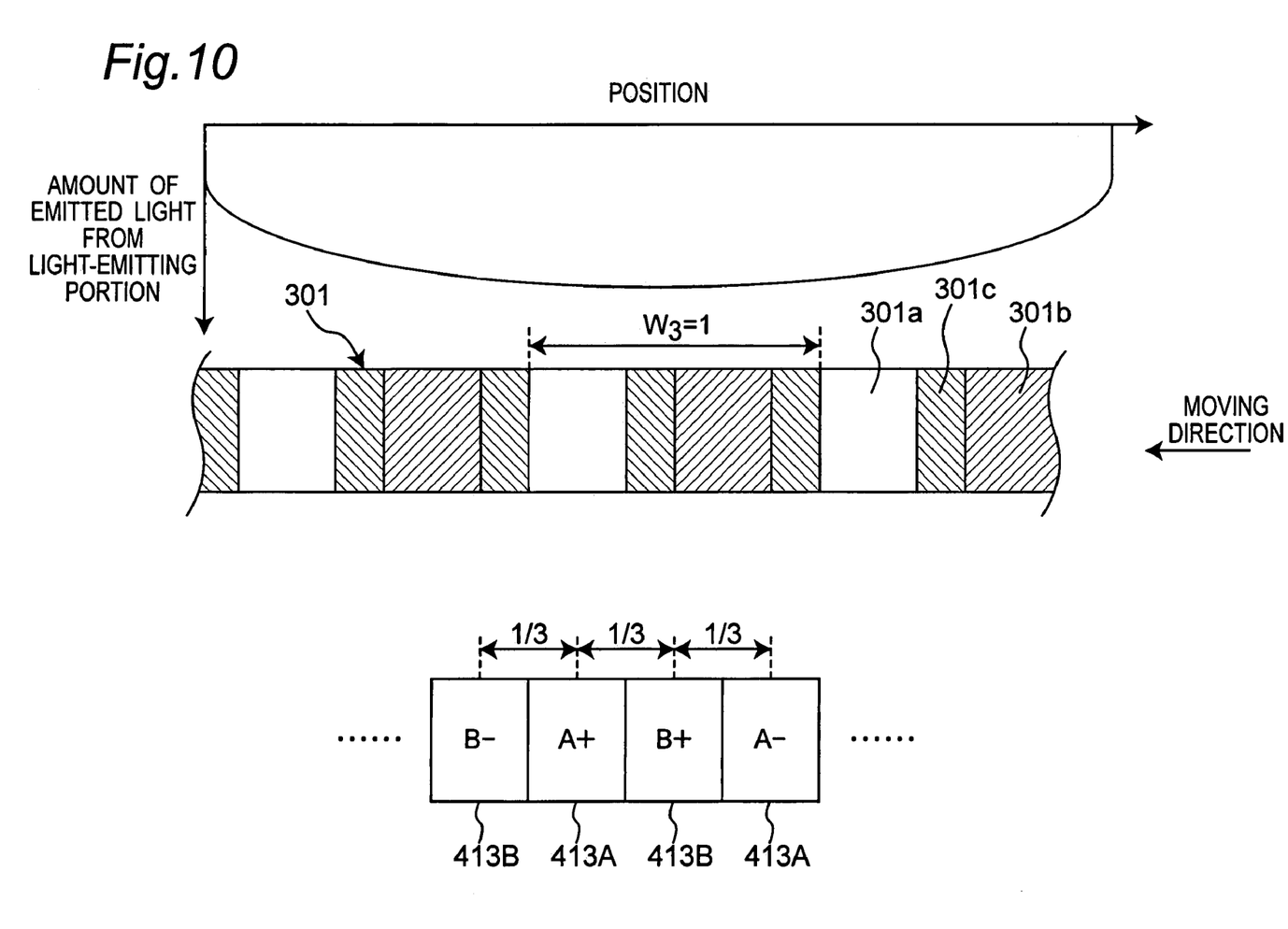
FIG. 10 is a schematic view for explaining a modified example of the optical encoder.

Further, as shown in FIG. 10, the mobile object 301 in FIG. 9, light-receiving photodiodes 413A of A− and A+ which receive long-wavelength light, and light-receiving photodiodes 413B of B− and B+ which receive short-wavelength light may used.

In an optical encoder in FIG. 10, all the widths of the light-receiving photodiodes 413A, 413B of A−, A+, B−, B+ are set to be almost identical, a width $W_3$ is set at 1, and a plurality of the light-receiving photodiodes 413B of B−, the light-receiving photodiodes 413A of A+, the light-receiving photodiodes 413B of B+ and the light-receiving photodiodes 413A of A− are placed repeatedly in this order at intervals of 1/3. This makes it possible to obtain four signals with different phases by the light-receiving photodiodes 413A, 413B of A−, A+, B−, B+. Obtaining these four signals is beneficial in circuit processing in the later stage.

In the configurations described in FIG. 8 to FIG. 10, the long-wavelength light transmission filter may be replaced with a long-wavelength light reflection filter and the short-wavelength light transmission filter may be replaced with a short-wavelength light reflection filter.

Figure 11:
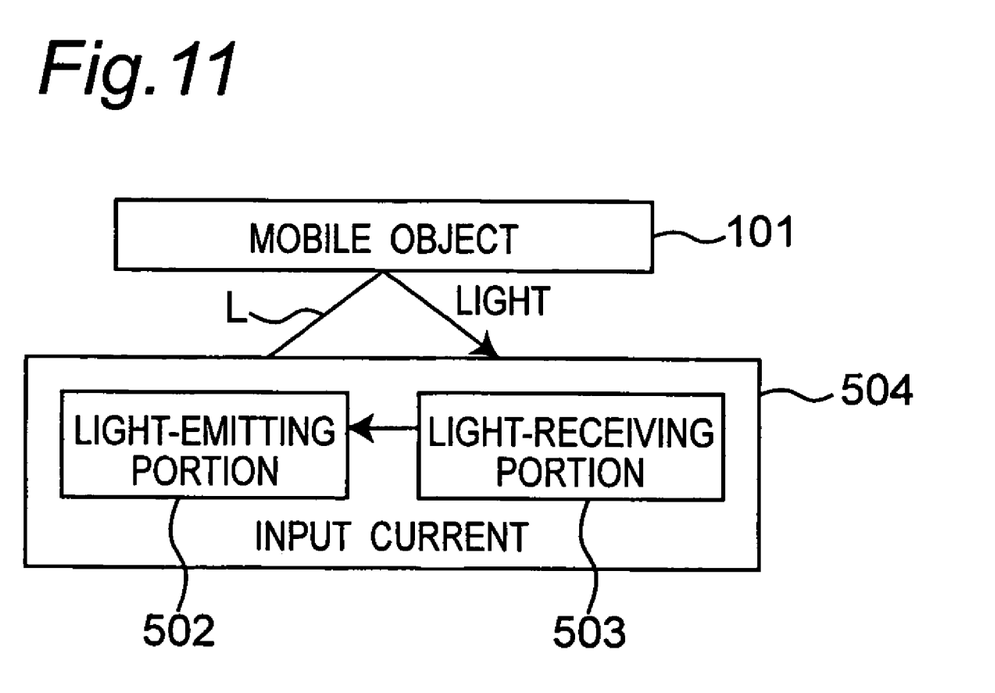
FIG. 11 is a schematic view for explaining a modified example of the optical encoder.

Although in this embodiment, the light-emitting portion 102 and the light-receiving portion 103 independent from the light-emitting portion 102 have been used, a light receiving/emitting unit 504 including a light-emitting portion 502 and a light-receiving portion 503 as shown in FIG. 11 may be used. In the light receiving/emitting unit 504, the light-emitting portion 502 emits light L toward the mobile object 101 and the light-receiving portion 503 receives the light L reflected by the mobile object 101.

Figure 12:
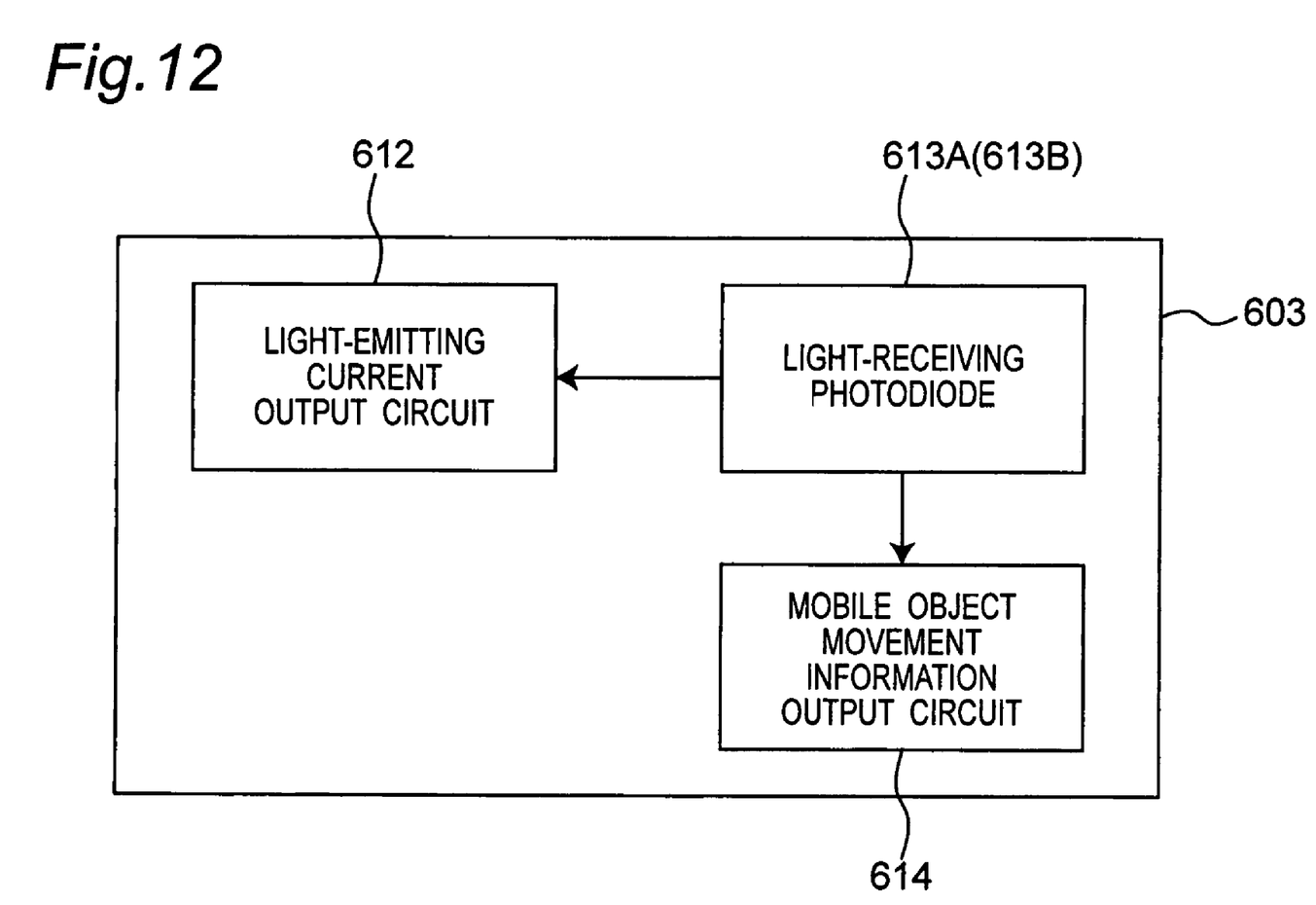
FIG. 12 is a schematic view for explaining a modified example of the optical encoder.

Although in this embodiment, an input current into the light-emitting portion 102 is changed to an AC by the light-emitting current output circuit 112 based on an AC signal in the oscillation circuit 111 as shown in FIGS. 1 and 2, an input current into the light-emitting portion 102 may be changed to an AC by a light-emitting current output circuit 612 based on output signals from the light-receiving photodiodes 613A, 613B in a light-receiving portion 603 as shown in FIG. 12. In this case, the light-emitting current output circuit 612 is an example of the driving means.

In the case of using the light-receiving portion 603, change in the amount of received light in the light-receiving photodiodes 613A, 613B due to movement of the mobile object 101 may be detected, and emission intensity of the light-emitting portion 102 may be changed in response to the moving velocity of the mobile object 101. The light-receiving photodiodes 613A, 613B used in this case do not have to be identical to the light-receiving photodiodes used in a mobile object movement information output circuit 614.

In the optical encoder in the present embodiment, the change cycle of the emission intensity may be almost identical to the movement cycle of the slits.

The optical encoder in the present invention is preferably for use as a photosensor in printing apparatuses such as copiers and printers as well as in FA equipment.

The shape of the mobile object for use in the optical encoder in the present invention includes a circular disc shape and a band shape. A circular disc-shaped mobile object has a plurality of light transmission portions aligned in the circumferential direction. In this case, the light transmission portions may be formed in a plurality of rows in the radial direction. Moreover, a band-shaped mobile object has a plurality of light transmission portions aligned in the direction that the mobile object extends.

Although the present invention has been presented as described above, it is ready understood that the present invention may be rearranged in various methods. Such rearrangements come within the spirit and scope of the invention, and all the modifications which will be apparent to those skilled in the art are intended to be embraced in the scope of the appended claims.

What is claimed is:

1. An optical encoder, comprising:
a light-emitting portion;
a mobile object having a plurality of aligned light transmission portions through which light emitted from the light-emitting portion is transmitted; and
a light-receiving portion for receiving the light coming via the mobile object, wherein
information on movement of the mobile object is detected based on change in an amount of received light in the light receiving portion, and
the light-receiving portion has a light-receiving device and a driving circuit, the driving circuit supplying an alternating current as an input current to the light-emitting portion.

2. The optical encoder as defined in claim 1, wherein the light transmission portion is a slit.

3. The optical encoder as defined in claim 1, wherein a cycle of the alternating current change is faster than a velocity of the mobile object.

4. The optical encoder as defined in claim 1, wherein the driving circuit changes emission intensity of the light-emitting portion in conformity with a moving velocity of the mobile object.

5. The optical encoder as defined in claim 4, wherein the light transmission portion is a slit, and
a change cycle of the emission intensity is almost identical to a movement cycle of the slit.

6. The optical encoder as defined in claim 5, wherein a plurality of the light-receiving device are present,
each width of the light-receiving devices is almost identical to a width of a portion present in between the light transmission portion and a light transmission portion adjacent to the light transmission portion, and
the light-receiving devices are placed at intervals of 3/4 and 5/4 alternately repeated assuming that a sum of a width of the light transmission portion and a width of the portion is 1.

7. The optical encoder as defined in claim 5, wherein a plurality of the light-receiving device are present,
each width of the light-receiving devices is narrower than a width of a portion present in between the light transmission portion and a light transmission portion adjacent to the light transmission portion, and the light-receiving devices are placed at intervals of ¾ and ⁵⁄₄ alternately repeated assuming that a sum of a width of the light transmission portion and a width of the portion is 1.

8. The optical encoder as defined in claim 1, wherein the light has a plurality of different wavelengths, and the light transmission portion comprises a first filter and a second filter different in light transmission wavelength or light reflection wavelength from the first filter.

9. The optical encoder as defined in claim 8, wherein a plurality of the light-receiving device are present, and a light-receiving wavelength of one of the light-receiving devices is different from the light-receiving wavelength of the other light-receiving devices.

10. The optical encoder as defined in claim 8, wherein the mobile object has a non-light transmission region where the light is not transmitted or a non-light reflection region where the light is not reflected.

11. The optical encoder as defined in claim 10, wherein a width of the first filter and a width of the second filter are almost identical, a width of the non-light transmission region or the non-light reflection region is ½ the width of the first and second filters, and the non-light transmission region or the non-light reflection region is placed in between the first filter and the second filter.

12. The optical encoder as defined in claim 11, wherein a plurality of the light-receiving device are present, each width of the light-receiving devices is almost identical to a width of the first and second filters, and the light-receiving devices are placed such that with a placement cycle of the first filter being 1, an interval of ⅓ and an interval of ⅔ are alternately repeated.

13. The optical encoder as defined in claim 11, wherein a plurality of the light-receiving device are present, each width of the light-receiving devices is almost identical to a width of the first and second filters, and the light-receiving devices are placed at ⅓ intervals assuming that a placement cycle of the first filter is 1.

14. Electronic equipment comprising the optical encoder as defined in claim 1.

* * * * *